United States Patent Office 2,782,350
Patented Feb. 19, 1957

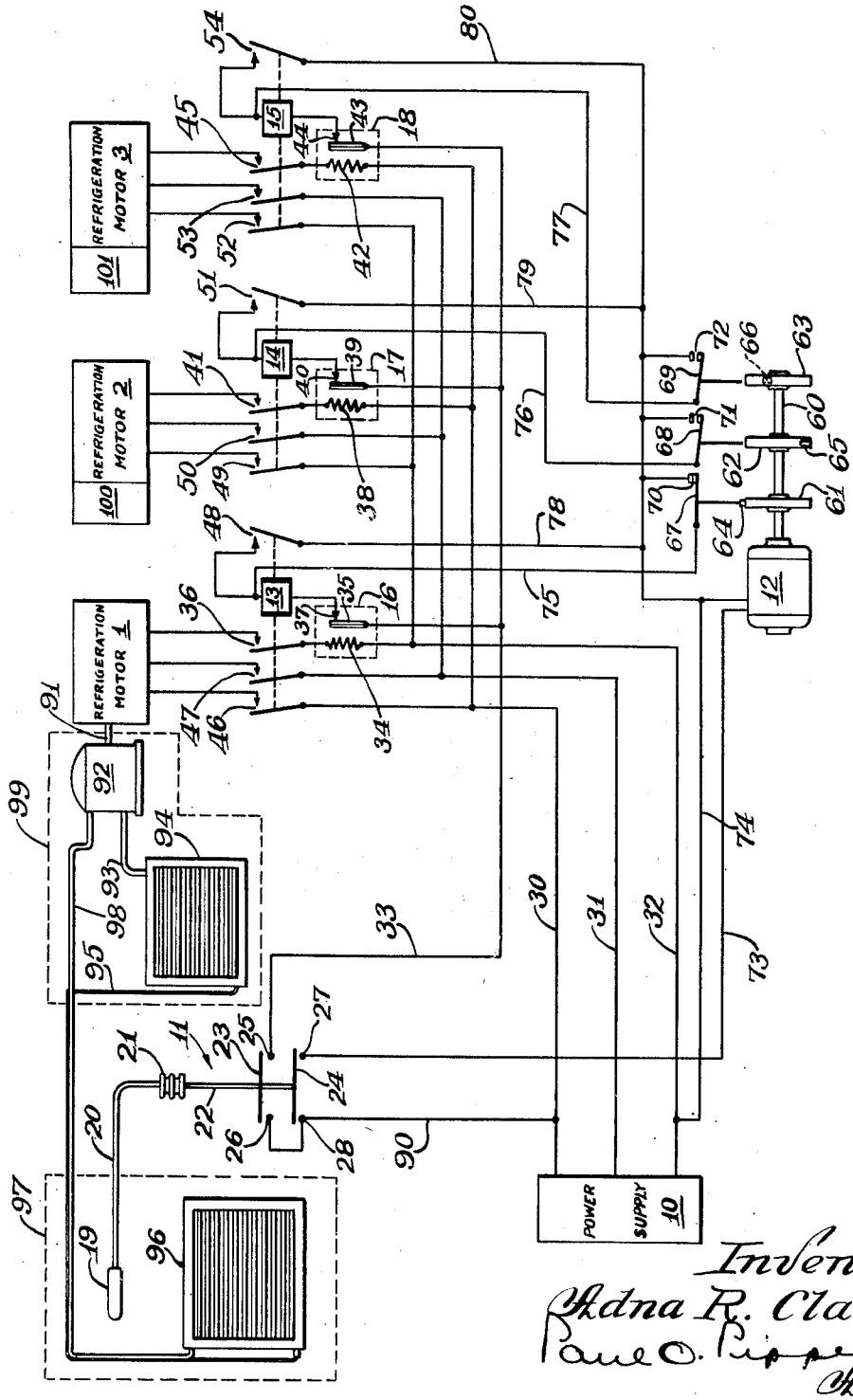

2,782,350

ELECTRICAL CIRCUIT FOR MULTIPLE MOTOR SYSTEM

Adna R. Clark, Evansville, Ind., assignor, by mesne assignments, to Whirlpool-Seeger Corporation, a corporation of Delaware Application August 6, 1953, Serial No. 372,625

5 Claims. (Cl. 318—102)

This invention relates to refrigeration systems, and more specifically to an improved arrangement for controlling the operation of a plurality of motors of a refrigeration system.

It is a common practice in the art to provide a plurality of refrigeration units where a large volume or area must be cooled or refrigerated to a considerable degree, such as in the case of commercial walk-in refrigerators and railroad refrigeration cars. Each of the plurality of refrigeration units is generally operated by a separate electrical motor. As is well known in the art, the starting load of a relatively large electric motor is considerably greater than the running load of the electrical motor. As the motor starts, a large amount of current is drawn from the power source and as the amperage supplied by the power source increases, the voltage will decrease a proportional amount. It is, therefore, conceivable that the voltage supplied by a power source to a refrigeration system comprising a plurality of refrigeration motors may drop to a value so low that the electric motors would not be able to reach a running speed. Therefore, it is an object of this invention to provide a refrigeration control system which will solve the above noted problems.

It is another object of this invention to provide a control system which will effectively and efficiently operate when a plurality of refrigeration unit motors are initially started, and when one or more refrigeration motors are restarted after one or more of the refrigeration unit motors have been stopped due to an overloading thereof.

It is a feature of this invention that specific means are provided for sequentially starting a plurality of refrigeration unit motors and for preventing the restarting of more than one refrigeration motor at a time when more than one refrigeration unit motor has been stopped due to an overloading thereof.

Other objects and features of the present invention will be apparent upon a perusal of the following specification and drawing wherein the preferred embodiment of the invention is diagramatically shown.

The present embodiment is the preferred embodiment but it is to be understood that changes can be made in the present embodiment by one skilled in the art without departing from the spirit and scope of this invention.

For a general description of the invention reference is made to the drawing. Three refrigeration motors, designated refrigeration motor 1, refrigeration motor 2, and refrigeration motor 3, are shown. It will be assumed for purposes of explanation that the three refrigeration motors are multi-phase motors, and therefore, a three phase power supply 10 is provided. Three conductors 30, 31 and 32 are connected to the power supply 10 and to other circuits to be described below. The essential elements of the control circuit are a thermostatically operated switch 11, a timing motor 12 and three relays 13, 14, and 15 with their associated contacts.

Refrigeration motor 1 is connected by driving means 91 to a refrigerant compressor 92. When refrigeration motor 1 is operating, the refrigerant compressor 92 will be operated to deliver warm gaseous refrigerant through the tubing 93 to a refrigerant condenser 94. Means (not shown) are provided in cooperation with the refrigerant condenser 94 to cool and condense the warm gaseous refrigerant passing therethrough to a liquid. The liquid refrigerant is then delivered by metering means 95 to a refrigerant evaporator 96 mounted in conjunction with the space 97 to be cooled. Means (not shown) are provided in cooperation with the refrigerant evaporator 96 to circulate air through the evaporator 96 to cause an evaporation of the refrigerant disposed therein and a cooling of the air passing therethrough. The evaporated refrigerant is then drawn through the suction line 98 back to the compressor 92 to complete a cycle of operation. The assembly encircled by the dotted line 99 is mounted without the space 97 to be cooled but convenient to the space 97 and the refrigeration motor 1. The above-described refrigeration means and assemblies may be of any type well known in the art. Refrigeration motors 2 and 3 are provided with similar assemblies which are mounted in cooperation with the space 97 to be cooled. For purposes of clarity and simplicity, these refrigeration means and assemblies are not shown in detail, but are shown in block form in conjunction with the refrigeration motors 2 and 3 and are designated with the reference characters 100 and 101.

The thermostatically operated switch 11 is mounted in cooperation with the volume or area 97 to be cooled or refrigerated. The timing motor 12 is connected to cooperate with the power supply 10, the thermostatically operated switch 11 and the three relays 13, 14, and 15, to provide proper operation of the present invention.

For a general description of the operation of the invention, reference is made to the drawing. When cooling of the volume or area 97 associated with the thermostatically operated switch 11 and the refrigeration components of the three separate refrigeration units is necessary, the thermostatically operated switch 11 is operated to cause the timing motor 12 to be energized. The timing motor 12 will then operate to sequentially complete three circuits. As each of these circuits is completed the three relays 13, 14, and 15 will be sequentially operated. As each relay is operated it will close its associated contacts to cause an energization of the associated refrigeration motor and to further complete a shunt circuit about a portion of its starting circuit. The refrigeration motors 1, 2 and 3 will then initially begin to operate one after the other in a definite order. Thus the power supply 10 will not be overloaded since one motor only will be started at any one time. After one of the motors has started to operate, the current that it will draw will drop off considerably, thereby permitting efficient starting of the next succeeding motor. In order to protect the system should one or more of the refrigeration motors 1, 2, and 3 be overloaded, three automatic overload controls 16, 17, and 18 are provided. If any one or more of the motors is overloaded its associated automatic overload control will operate to break the holding circuit for the associated relay and the relay will then be deenergized. The relay will then restore to open its associated contacts and break the operating circuit for the associated refrigeration motor. If the thermostatically operated switch 11 is still operated due to a need for further cooling, the refrigeration motor or motors dependent on whether one or more has been stopped due to an overload condition, will again be operated when the automatic overload control associated therewith has restored, and when the timing motor 12 again completes the necessary operating circuit for the relay associated with that refrigeration motor.

Turning next to a detailed description of the structure of the present invention reference is again made to the drawing. The power supply 10 may be of any type well known in the art which will supply suitable power requirements for the number and size of the refrigeration motors forming a part of the system. In the present embodiment it is assumed that a power supply 10 is provided which is sufficient to provide three phase power of a proper amperage and voltage to supply three multi-phase refrigeration motors for the running thereof, and for the starting of one when two of the three motors are running. As mentioned above, each of the refrigeration motors 1, 2, and 3, are associated with the other necessary parts of a conventional refrigeration system (described above).

The thermostatically operated switch 11 comprises a bulb 19, a length of tubing 20, a bellows 21, a movable arm 22 and two contact arms 23 and 24. The length of tubing 20 is connected to the bulb 19 and to one end of the bellows 21 in a sealed relationship therewith. The bulb 19 is filled with any substance well known in the art which will readily respond to temperature changes by an expansion and contraction thereof. The bulb 19 of the thermostatically operated switch 11 is mounted within the space 97 to be cooled so that the bellows 21 will respond to temperature changes within the space 97 to be cooled. The expansion and contraction of the bellows 21 will cause a movement of the arm 22 which is connected to the bellows 21. As the arm 22 moves the contact arms 23 and 24 will be moved to make and break circuits between the contacts 25 and 26, and 27 and 28 respectively. Means (not shown) may be provided for calibrating the thermostatically operated switch 11. Any means well known in the art are satisfactory. Contacts 28 and 26 are interconnected, and contact 28 is connected by conductor 90 to conductor 30 of the power supply 10. Contact 25 is connected in parallel to each of the automatic overload controls 16, 17 and 18 by means of the conductor 33.

The automatic overload controls 16, 17, and 18 may be of any type well known in the art. The automatic overload controls 16, 17 and 18 each comprise a heating element 34, 38 and 42 and a bi-metallic strip 35, 39 and 43, respectively. One end of the heating element 34 is connected to contacts 36 of relay 13. The other end of the heating element 34 is connected to conductor 32 of the power supply 10. The bi-metallic strip 35 is associated with a pair of contacts 37, and is connected in series with contacts 37 to one side of the relay 13 and to the conductor 33. The heating element 38 is connected between contacts 41 of relay 14 and conductor 30 of the power supply 10. The bi-metallic strip 39 is connected in series with contacts 40 to one side of the relay 14 and to the conductor 33. The heater element 42 is connected between contacts 45 of relay 15 and conductor 30 of the power supply 10. The bi-metallic strip 43 is connected in series with contacts 44 to one side of the relay 15 and to conductor 33.

Relays 13, 14, and 15 may be of any type well known in the art. In addition to the contacts already described, relay 13 additionally has contacts 46, 47, and 36, relay 14 has contacts 49, 50, and 41, and relay 15 has contacts 52, 53, and 45. When contacts 46, 47 and 36 of relay 13 are closed, the three conductors 30, 31, and 32 of the power supply 10 are connected to refrigeration motor 1 to cause refrigeration motor 1 to start to operate. When contacts 49, 50 and 41 of relay 14 are closed, conductors 30, 31 and 32 of the power supply 10 are connected to refrigeration motor 2, and refrigeration motor 2 will start to operate. When contacts 52, 53, and 45 of relay 15 are closed conductors 30, 31 and 32 of the power supply 10 are connected to refrigeration motor 3, and refrigeration motor 3 will start to operate. As may easily be seen from the foregoing, the heating element 34 is in series with one of the conductors to refrigeration motor 1, the heating element 38 is in series with one of the conductors to the refrigeration motor 2, and the heating element 42 is in series with one of the conductors to the refrigeration motor 3. Thus the current drawn by refrigeration motor 1 will pass through heating element 34, the current drawn by refrigeration motor 2 will pass through heating element 38, and the current drawn by refrigeration motor 3 will pass through the heating element 42. The bi-metallic strips 35, 39, and 43 are so constructed that upon being heated a predetermined amount they will flex to open the contacts associated therewith. The resistances of the heating elements 34, 38, and 42 are selected to have a value such that at a predetermined condition of overload of one of the refrigeration motors a sufficient amount of current will be drawn through one of the resistors 34, 38 or 42 to cause the bi-metallic strip associated therewith to flex to open the contacts associated therewith, specifically either contacts 37, 40 or 44. When the overload of the motor has been removed or if the operating circuit therefor has been opened, the heating element associated therewith will cool, in turn permitting the bi-metallic strip associated therewith to cool. At this time the bi-metallic strip will restore to close its associated contacts.

The timing motor 12 may be of any type well known in the art. The timing motor 12 in the present embodiment may be a split phase induction motor and is shown connected to conductor 32 of the power supply 10, and connected to contact 27 through conductor 73. The shaft 60 of the motor 12 is provided with three separate cam elements 61, 62, and 63, each cam element 61, 62, and 63 is provided with one or more cams 64, 65, and 66 on the periphery thereof. A number of contact arms 67, 68 and 69 are associated with each of the cams 64, 65, and 66. The contact arm 67 is provided with a pair of contacts 70. The contact arm 68 is provided with a pair of contacts 71, and the contact arm 69 is provided with a pair of contacts 72. The cams 64, 65, and 66 are so positioned upon the cam elements 61, 62, and 63 that the contact arm 67, 68, and 69 are sequentially moved to sequentially close and open the contacts 70, 71, and 72. The cams 64, 65, and 66 may be positioned upon the cam elements 61, 62, and 63 to permit any predetermined sequence of operation of the contacts 70, 71, and 72, with no contact being operated simultaneously with any other contact. Contacts 70 are connected to conductor 32 of the power supply 10 through conductor 74 and to one side of the relay 13 through conductor 75. Contacts 71 are connected to conductor 32 of power supply 10 through conductor 74 and to one side of the relay 14 through conductor 76. Contacts 72 are connected to the conductor 32 of the power supply 10 through the conductor 74 and to one side of the relay 15 through the conductor 77. A shunt circuit about contact 70 is provided by means of contacts 48 connected to one side of the relay 13 and the conductor 78 connected to conductor 32 of the power supply 10 through conductor 74. A shunt about contact 71 is provided by means of contacts 51 connected to one side of relay 14 and conductor 79 connected to conductor 32 of the power supply 10 through the conductor 74. A shunt circuit is provided about contacts 72 by means of the contacts 54 connected to one side of the relay 15 and connected to conductor 32 of the power supply 10 through conductors 74 and 80.

Turning next to a detailed description of the operation of the present invention, it will first be assumed that the refrigeration system is completely restored and that the temperature within the compartment 97 to be cooled has risen to a degree wherein cooling is required. The thermostatic bulb 19 operating in conjunction with the bellows 21 through the length of tubing 20 will cause a movement of the arm 22 to connect the contact arm 23 between the contacts 25 and 26, and connect the contact arm 24 between the contacts 27 and 28. The following circuit for the operation of the timing motor 12 will then be completed: from the power supply 10 through conductor 30, conductor 90, contact 28, contact arm 24, contact 27, conductor 73, timing motor 12, conductor 74, conductor 32 to the power supply 10. The timing motor 12 will then begin to operate to rotate shaft 60. The operation of the thermostatically operated switch 11 will also complete the following circuit: from the power supply 10, conductor 30, conductor 90, contact 28, contact 26, contact arm 23, contact 25, conductor 33 to and in parallel through each of the bi-metallic strips 35, 39, and 43, through the contacts 37, 40, and 44, through the relays 13, 14, and 15, and through the conductors 75, 76, and 77 to the cam arms 67, 68, and 69. The latter described circuit will be extended no further unless one of the contacts 70, 71 or 72 are closed. Assuming that the timing motor 12 has operated to the position shown in the drawing wherein cam 64 has contacted the cam arm 67 to cause contact 70 to be closed, the latter described circuit including the parallel branch of relay 13 will be extended from contact 70, cam arm 67, conductor 74, conductor 32 to power supply 10. This will cause the energization of relay 13 which will operate to close its contacts 46, 47, 36, and 48. The closing of contacts 46, 47, and 36 will cause the power supply 10 to be connected to the refrigeration motor 1 through these contacts and conductors 30, 31, and 32. The closing of contacts 48 will complete the following shunt circuit about contact 70: from one side of relay 13, contacts 48, conductor 78, conductor 74, conductor 32 to the power supply 10. Thus when the timing motor 12 further operates to cause the contacts 70 to be opened, the relay 13 will remain operated through the above described shunt circuit. The connection of the power supply 10 to the refrigeration motor 1 will initiate the operation of the refrigeration motor 1, and since only one refrigeration motor is being operated at this time, the power supply 10 will not be overloaded and sufficient voltage will be supplied to insure proper running operation of the refrigeration motor 1.

The timing motor 12 will then continue to operate, thereby causing the opening of contacts 70 and the closing of contacts 71. When contacts 71 are closed the circuit including relay 14 and conductor 76 as a parallel branch will be extended through contacts 71, conductor 74, conductor 32, to power supply 10 to cause the operation of relay 14. When relay 14 operates contacts 49, 50, 41, and 51 will be closed. The closing of contacts 49, 50, and 41 will connect refrigeration motor 2 to the power supply 10 through these contacts and through the conductors 30, 31 and 32. The refrigeration motor 2 will then begin to operate, and since refrigeration motor 1 has already reached its running speed and refrigeration motor 3 is unoperated, refrigeration motor 2 will start without an excessive drain upon the power supply 10. The closing of contacts 51 completes the following shunt circuit about contacts 71: from one side of relay 14 contacts 51, conductor 79, conductor 74, conductor 32 to the power supply 10. Thus relay 14 will be held operated after contacts 71 have been opened by the continuing operation of the timing motor 12.

As the timing motor 12 continues to operate, contacts 71 will be opened, and contacts 72 will be closed. The closing of contacts 72 will extend the previously described circuit including 15 and conductor 77 as a parallel branch, through contacts 72, conductor 74, conductor 32 to the power supply 10. This will cause the energization of relay 15 which will operate to close its contacts 52, 53, 45, and 54. The closing of contacts 52, 53, and 45 will connect refrigeration motor 3 to the power supply 10 through these contacts and through the conductors 30, 31 and 32. A heavy drain of current upon the power supply 10 is prevented, since refrigeration motors 1 and 2 have already reached their running speeds. Thus refrigeration motor 3 will reach its running speed without overloading the power supply 10. The closing of contacts 54 will complete the following shunt circuit about the contacts 72: from one side of relay 15, contacts 54, conductor 80, conductor 74, conductor 32 to the power supply 10. Thus relay 15 will remain operated although contacts 72 are opened by the continuing operation of the timing motor 12. Refrigeration motors 1, 2, and 3 will then remain operating as long as the thermostatically operated switch 11 is operated and as long as one or more of the refrigeration motors 1, 2, and 3 are not overloaded.

Should one or more of the refrigeration motors be overloaded, the heating element associated therewith will break the operating circuit for that refrigeration motor. Assuming for purposes of explanation that refrigeration motor 1 is overloaded by some means, the overloading thereof will cause that motor to draw an excessive amount of current. The excessive amount of current passing through the heating element 34 will cause the temperature of the heating element 34 to rise to some degree dependent upon the amount of overload. The heat from the heating element 34 will heat the bi-metallic strip 35, and the bi-metallic strip 35 will, upon reaching a certain temperature, flex to open contacts 37. The opening of contacts 37 will break the holding circuit for relay 13, and relay 13 will restore. As relay 13 restores contacts 46, 47, 36, and 48 will open. The opening of contacts 46, 47, and 36 will break the operating circuit for the refrigeration motor 1 and refrigeration motor 1 will stop. The opening of contacts 48 will break a portion of the holding circuit for relay 13. Since the heating element 34 no longer transmits heat to the bi-metallic strip 35, a cooling of the bi-metallic strip 35 will result, and the bi-metallic strip 35 will again move to close contacts 37. The closing of contacts 37 will not cause a re-energization of relay 13 since contacts 48 have been opened. Relay 13 can only be reoperated again when contacts 70 are closed by the operation of the timing motor 12. When the timing motor 12 operates to the position wherein contacts 70 are closed, relay 13 will again operate to complete its holding circuit and to cause the reoperation of refrigeration motor 1.

Assuming further that refrigeration motor 1 and refrigeration motor 2 are overloaded at substantially the same time. As previously described, heating element 34 will heat bi-metallic strip 35 to cause an opening of contacts 37, and in a similar manner heating element 38 will heat the bi-metallic strip 39 to cause an opening of the contacts 40. Relays 13 and 14 will then restore opening their associated contacts. After the bi-metallic strips 35 and 39 have cooled sufficiently to cause the closing of contacts 37 and 40, relays 13 and 14 are prepared for reoperation. However, relays 13 and 14 will not operate simultaneously since their operating circuits are completed by contacts 70 and 71 associated with the timing motor 12. Thus, a continuing operation of the timing motor 12 will close contacts 70 to first cause the operation of relay 13 and in turn the operation of refrigeration motor 1, and after this has been accomplished, the timing motor 12 will cause the closing of contacts 71 to cause the operation of relay 14 and in turn the operation of refrigeration motor 2. Thus, it may be seen that when more than one refrigeration motor is restored due to an overloading thereof, the refrigeration motors will not again be operated simultaneously, but will be sequentially reoperated.

When the refrigeration requirements of the space to be cooled are satisfied, the bulb 19 which is in thermal contact with the space 97 which is cooled will cause a contraction of the bellows 21 through the length of tubing 20. The contraction of the bellows 21 will cause a movement of the contact arm 22 to move the contact arms 23 and 24 from contacts 25, 26, and 27 and 28 respectively. This movement of the contact arms 23 and 24 will break the operating circuit for the timing motor 12 which will then restore, and will disconnect conductor 30 of the power supply 10 from relays 13, 14, and 15. The system is then prepared for a reoperation thereof upon a demand for further cooling from the space 97 to be cooled.

Having described the invention what is considered new and desired to be protected by Letters Patent is:

1. In combination, a plurality of refrigeration motors, a power supply, a plurality of relays, a plurality of automatic overload controls, each of said automatic overload controls associated with the windings of one of said relays, circuit means connected to said power supply and associated with each of said relays and each of said automatic overload controls and operating responsive to the operation of said relays for connecting said power supply to the refrigeration motors associated therewith, timing means operable to sequentially initially momentarily energize each of said relays, shunt circuit means operating responsive to the initial operation of each of said relays for shunting said timing means to hold said relays energized, each of said automatic overload controls operating responsive to an overload of the refrigeration motor associated therewith for opening the shunt circuit means associated therewith.

2. In a refrigeration system having a plurality of refrigeration motors and a power supply, a plurality of relays, a plurality of automatic overload controls, each of said automatic overload controls associated with the windings of one of said relays, circuit means connected to said power supply and associated with each of said relays and each of said automatic overload controls and operating responsive to the operation of said relays for connecting said power supply to the refrigeration motors associated therewith, timing means operable to sequentially initially momentarily energize each of said relays, shunt circuit means operating responsive to the initial operation of each of said relays for shunting said timing means to hold said relays energized, thermostatically operated means operating responsive to certain predetermined temperature changes to operate said timing means, each of said automatic overload controls operating responsive to an overload of the refrigeration motor associated therewith for opening said shunt circuit means associated therewith to deenergize the relay associated therewith.

3. In a refrigeration system having a plurality of refrigeration motors and having a power supply, an automatic overload control associated with each of said refrigeration motors, a plurality of relays, each of said relays associated with one of said refrigeration motors and one of said automatic overload controls, circuit means associated with each of said relays and operating responsive to the operation of said relays for connecting each of said refrigeration motors to said power supply, means operable to initially momentarily energize each of said relays, circuit means operating responsive to the initial energization of each of said relays for closing a holding circuit for each of said relays, said automatic overload controls connected in each of said holding circuits so that each of said holding circuits are open responsive to an operation of the automatic overload control associated therewith.

4. In a refrigeration system having a plurality of refrigeration motors and having an automatic overload control associated with each of said motors, a power supply, means associated with each of said refrigeration motors and operable to separately connect each of said refrigeration motors to said power supply, means operable to operate said first means to initially momentarily connect each of said refrigeration motors sequentially to said power supply, circuit means including said automatic overload controls and operating responsive to the operation of said first means to hold said first means operated to hold said refrigeration motors connected to said power supply and operating responsive to the operation of any of said automatic overload controls to restore said first means for said refrigeration motors associated with the operated automatic overload controls.

5. In a refrigeration system having a plurality of refrigeration motors and having an automatic overload control associated with each of said motors and having a power supply for the operation of each of said motors, relay means for each of said refrigeration motors, each of said relay means operable to connect one of said refrigeration motors to said power supply, timing means operable to operate each of said relay means in a predetermined sequence to initially momentarily connect each of said refrigeration motors to said power supply, circuit means for each of said relay means, each of said circuit means including one of said automatic overload controls and operating responsive to the operation of the relay means associated therewith for holding said relay means operated after the initial operation thereof and operating responsive to the operation of said automatic overload controls for restoring said relay means.

References Cited in the file of this patent
UNITED STATES PATENTS

| | | |
|---|---|---|
| 2,157,329 | Fillo | May 9, 1939 |
| 2,178,807 | Ploeger | Nov. 7, 1939 |
| 2,237,304 | Greenlee | Apr. 8, 1941 |